United States Patent
Lee et al.

(10) Patent No.: US 11,079,943 B2
(45) Date of Patent: Aug. 3, 2021

(54) STORAGE DEVICES INCLUDING IMPROVED OVER PROVISION MANAGEMENT AND OPERATING METHODS OF SUCH STORAGE DEVICES

(71) Applicant: Samsung Electronics Co., Ltd., Suwon-si (KR)

(72) Inventors: Sang-Geol Lee, Hanam-si (KR); Hyun-Woon Kim, Seoul (KR); Eun Woo Jang, Yongin-si (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/524,920

(22) Filed: Jul. 29, 2019

(65) Prior Publication Data

US 2020/0174685 A1 Jun. 4, 2020

(30) Foreign Application Priority Data

Dec. 4, 2018 (KR) .................... 10-2018-0154413

(51) Int. Cl.
*G06F 3/06* (2006.01)
*G06F 12/10* (2016.01)

(52) U.S. Cl.
CPC .......... *G06F 3/0631* (2013.01); *G06F 3/0604* (2013.01); *G06F 3/0659* (2013.01); *G06F 3/0679* (2013.01); *G06F 3/0689* (2013.01); *G06F 12/10* (2013.01); *G06F 2212/262* (2013.01)

(58) Field of Classification Search
None
See application file for complete search history.

(56) References Cited

U.S. PATENT DOCUMENTS

| | | | |
|---|---|---|---|
| 8,572,311 B1 * | 10/2013 | Shalvi | G06F 11/1016 711/103 |
| 9,372,788 B2 | 6/2016 | Gu | |
| 9,678,677 B2 | 6/2017 | Grimsrud | |
| 9,921,912 B1 | 3/2018 | Vankamamidi | |
| 10,019,356 B2 | 7/2018 | Hashimoto | |
| 2009/0259799 A1 * | 10/2009 | Wong | G06F 11/1044 711/103 |
| 2010/0070729 A1 * | 3/2010 | Ng | G06F 3/0631 711/166 |
| 2014/0122787 A1 * | 5/2014 | Shalvi | G06F 12/023 711/103 |

(Continued)

OTHER PUBLICATIONS

Roger Beck, "Here Is the Physics Behind the Magic 80% Rule for Media Storage and File Systems", Studio Daily, Dec. 27, 2017 (6 pages).

*Primary Examiner* — Edward J Dudek, Jr.
*Assistant Examiner* — Ralph A Verderamo, III
(74) *Attorney, Agent, or Firm* — Myers Bigel, P.A.

(57) ABSTRACT

A storage device includes a nonvolatile memory device including a storage space, and a controller that is configured to divide and manage the storage space of the nonvolatile memory device into a user area and a meta area and to provide access to the user area to a host device. Responsive to receiving Redundant Array of Inexpensive Disks (RAID) spare information from the host device, the controller is further configure to select a RAID spare area from the user area based on the RAID spare information and to use at least a portion of the RAID spare area as an over provision area.

20 Claims, 11 Drawing Sheets

(56) References Cited

U.S. PATENT DOCUMENTS

| | | |
|---|---|---|
| 2016/0299722 A1 | 10/2016 | Seo |
| 2016/0342476 A1* | 11/2016 | Nazari ................ G06F 11/1092 |
| 2017/0123915 A1 | 5/2017 | Nguyen |
| 2017/0315745 A1* | 11/2017 | Agombar .............. G06F 3/0689 |
| 2019/0196732 A1* | 6/2019 | Desai ................... G06F 3/0604 |

* cited by examiner

STORAGE DEVICES INCLUDING IMPROVED OVER PROVISION MANAGEMENT AND OPERATING METHODS OF SUCH STORAGE DEVICES

CROSS-REFERENCE TO RELATED APPLICATION

This application claims priority under 35 U.S.C. § 119 to Korean Patent Application No. 10-2018-0154413 filed on Dec. 4, 2018, in the Korean Intellectual Property Office, the entire contents of which are incorporated by reference herein.

BACKGROUND

Embodiments of the inventive concepts described herein relate to semiconductor devices, and more particularly, relate to storage devices using a spare area specified by a host device as an over provision area, and operating methods of the storage devices.

A storage device may include a nonvolatile memory device and a controller controlling the nonvolatile memory device. The nonvolatile memory device may include a flash memory device, a phase change memory device, a ferroelectric memory device, a magnetic memory device, a resistive memory device, etc.

Among the nonvolatile memory devices, the flash memory device has an erase-before-write characteristic. To write data in a specific area of the flash memory device, an erase operation may be first performed on the specific area. That is, the flash memory device may not support an overwrite operation.

When an overwrite operation is not supported, a decrease in an access speed of the flash memory device may occur. To increase an access speed of the flash memory device, the storage device may use a partial storage area of the flash memory device. That is, the partial storage area of the flash memory device may be used to improve performance and may not be provided to the host device.

As a capacity of the storage device increases, a capacity of an area of the storage device that may be used to improve performance (e.g., as a partial storage area) may also increase. This may mean that a capacity which is unusable in the storage device also increases.

SUMMARY

Embodiments of the inventive concepts provide a storage device increasing an amount of a storage space available for use and an operating method of the storage device.

According to an embodiment of the inventive concepts, a storage device includes a nonvolatile memory device including a storage space, and a controller that is configured to divide and manage the storage space of the nonvolatile memory device into a user area and a meta area and to provide access to the user area to a host device. Responsive to receiving Redundant Array of Inexpensive Disks (RAID) spare information from the host device, the controller is further configured to select a RAID spare area from the user area based on the RAID spare information and to use at least a portion of the RAID spare area as an over provision area.

According to an embodiment of the inventive concepts, a storage device includes a nonvolatile memory device including a storage space, and a controller that is configured to divide and manage the storage space of the nonvolatile memory device into a user area, a first over provision area, and a meta area and to provide access to the user area to a host device. Responsive to receiving RAID spare information from the host device, the controller is further configured to select a RAID spare area from the user area based on the RAID spare information and to use at least a portion of the RAID spare area as a second over provision area.

According to an embodiment of the inventive concepts, a method of operating a storage device which includes a nonvolatile memory device and a controller includes providing, by the controller, capacity information of a user area of the storage device to a host device, receiving, by the controller, RAID spare information from the host device, dividing, by the controller, the user area into a main use area and a RAID spare area based on the RAID spare information, and supporting, by the controller, a read operation and a write operation for the main use area by using at least a portion of the RAID spare area as an over provision area.

BRIEF DESCRIPTION OF THE FIGURES

The above and other objects and features of the inventive concepts will become apparent by describing in detail example embodiments thereof with reference to the accompanying drawings.

DETAILED DESCRIPTION

Example embodiments of the inventive concepts will now be described more fully with reference to the accompanying drawings, in which example embodiments are shown.

Figure 1:
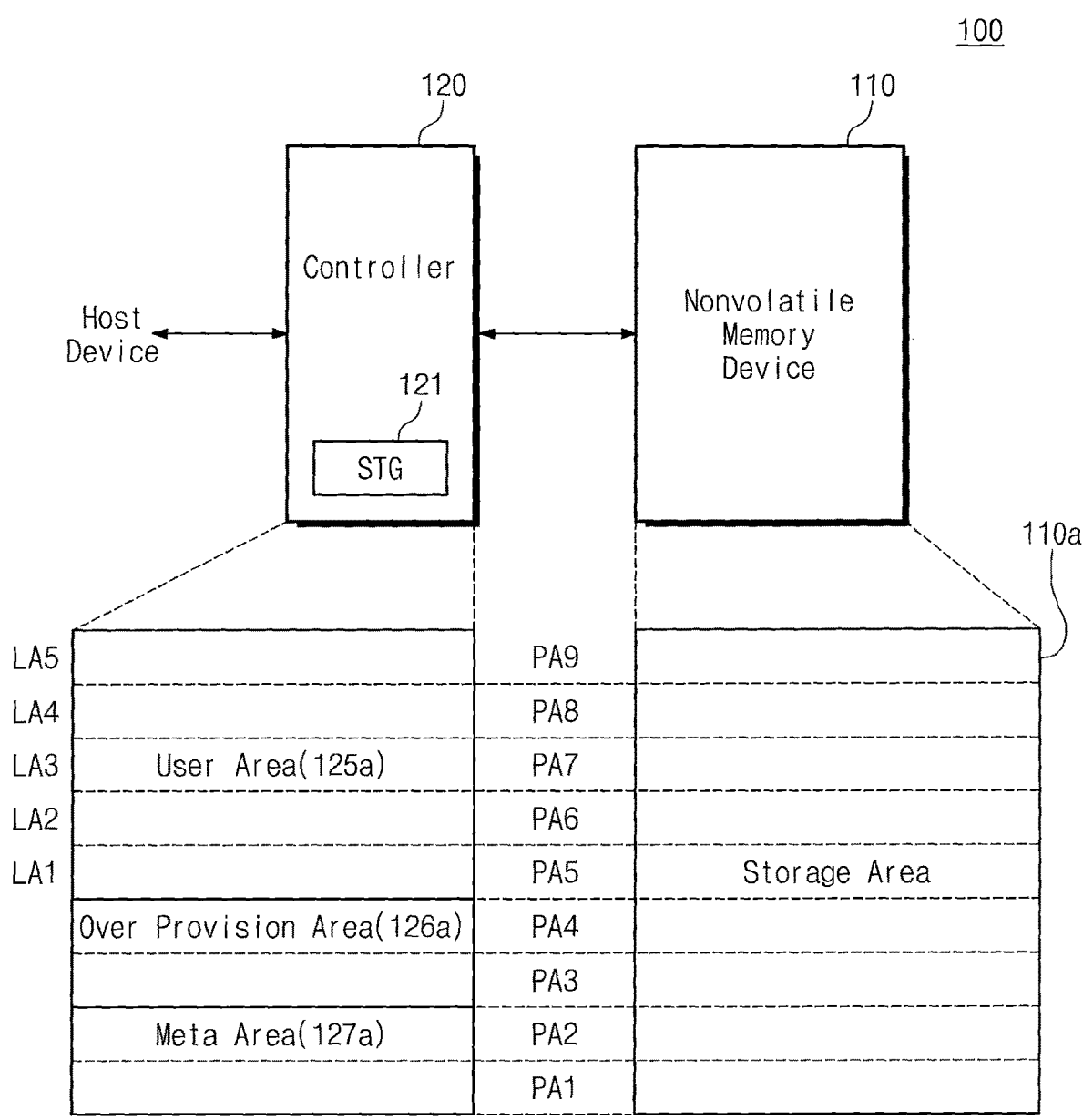
FIG. 1 illustrates a storage device according to an embodiment of the inventive concepts.

FIG. 1 illustrates a storage device 100 according to an embodiment of the inventive concepts. Referring to FIG. 1, the storage device 100 includes a nonvolatile memory device 110 and a controller 120.

The nonvolatile memory device 110 may include a flash memory device, a phase change memory device, a ferroelectric memory device, a magnetic memory device, a resistive memory device, etc. For convenience of description, it is assumed that the nonvolatile memory device 110 is a flash memory device. However, the inventive concepts are not limited to the flash memory device.

The controller 120 may control the nonvolatile memory device 110, based on a request of an external host device or an internally designated schedule. The controller 120 may request a read operation, a write operation, or an erase operation from the nonvolatile memory device 110.

The controller 120 may identify a storage area 110*a* of the nonvolatile memory device 110 by using physical addresses. For example, the storage area 110*a* of the nonvolatile memory device 110 may be identified by using first to ninth physical addresses PA1 to PA9. Though nine physical addresses are illustrated in FIG. 1, these are used for convenience of description and are not intended to limit the inventive concepts. A different number of physical addresses may be used without deviating from the inventive concepts.

The controller 120 may divide the storage area 110*a* of the nonvolatile memory device 110 into a user area 125*a*, an over provision area 126*a*, and a meta area 127*a*. The controller 120 may provide the user area 125*a* to the host device. For example, the controller 120 may notify the host device of a capacity of the user area 125*a* as a capacity of the storage device 100.

The controller 120 may include storage 121 (STG). The storage 121 may store information (e.g., capacity information) about a storage space of the storage device 100. When the storage device 100 is connected with the host device and is supplied with power, the controller 120 may provide information stored in the storage 121 to the host device.

Logical addresses may be assigned to the user area 125*a* by the host device. The host device may identify the user area 125*a* by using logical addresses. For example, the user area 125*a* may be identified by using first to fifth logical addresses LA1 to LA5.

The controller 120 may map logical addresses of the user area 125*a* onto physical addresses of the storage area 110*a* of the nonvolatile memory device 110. For example, the first to fifth logical addresses LA1 to LA5 may be respectively mapped onto fifth to ninth physical addresses PA5 to PA9.

Physical addresses mapped onto the first to fifth logical addresses LA1 to LA5 may vary with a manner in which the controller 120 controls the nonvolatile memory device 110. For example, the controller 120 may select physical addresses to be mapped onto the first to fifth logical addresses LA1 to LA5 in consideration of wear leveling of the storage area 110*a* of the nonvolatile memory device 110, reliability of data, fragmentation of data, etc.

That is, when the host device writes first data at the first to fifth logical addresses LA1 to LA5 and updates the first data with second data, in the nonvolatile memory device 110, a location (e.g., a physical address) of the storage area 110*a* at which the first data are written may be different from a location (e.g., a physical address) of the storage area 110*a* at which the second data are written.

The controller 120 may store meta information for managing the storage device 100 in the meta area 127*a*. For example, the controller 120 may store mapping information of logical addresses and physical addresses in the meta area 127*a*. Also, the controller 120 may store firmware or codes for driving the storage device 100 in the meta area 127*a*.

In some embodiments, the controller 120 may specify a specific location of the storage area 110*a* of the nonvolatile memory device 110, that is, an area, which fixed physical addresses (e.g., PA1 and PA2) indicate, as the meta area 127*a*. In some embodiments, the controller 120 may select physical addresses to be assigned to the meta area 127*a* in consideration of wear leveling of the storage area 110*a* of the nonvolatile memory device 110, reliability of data, fragmentation of data, etc.

The controller 120 may support an access to the user area 125*a* by using the over provision area 126*a*. For example, the controller 120 may support a read operation and a write operation for the user area 125*a* by using the over provision area 126*a*.

In an embodiment, when the nonvolatile memory device 110 is a flash memory device, the nonvolatile memory device 110 does not support an overwrite operation. In an overwrite operation, a storage location may be directly overwritten with replacement data without requiring an erase operation followed by a subsequent write. The host device may write first data in a specific area of the user area 125*a* and may update the first data with second data.

In the case where the overwrite operation is not supported, the controller 120 may erase the first data of the specific area of the user area 125*a* and may write the second data in the specific area. That is, because the controller 120 performs an erase operation and a write operation in response to a write command of the host device, a response speed of the storage device 100 may decrease.

The controller 120 may increase a response speed by using the over provision area 126*a*. For example, the controller 120 may write the second data in a free space of the over provision area 126*a* and may declare the first data to be invalid data. In the case where the over provision area 126*a* is used, because the controller 120 performs only the write operation in response to a write command of the host device, a response speed of the storage device 100 may be improved.

As the number of times that the controller 120 reads data of the user area 125*a* increases, reliability of the read data decreases. The controller 120 may perform a read reclaim operation of writing data of decreased reliability in any other storage space. Instead of erasing existing data and again writing the existing data, the controller 120 may write the existing data in the over provision area 126*a* and may declare the existing data to be invalid data. Accordingly, a speed of the read reclaim operation may be improved.

A unit of an erase operation of the nonvolatile memory device 110 (e.g., an erase unit) may have a size that is greater than a unit of a write operation and a read operation (e.g., a read and write unit). For example, an erase unit may be a block size that may be, for example 128 KB to 256 KB or megabytes in size, while the read and write units may be, for example, bytes or pages (e.g., 4 KB). Accordingly, even though invalid data occur in a specific erase unit, valid data may be present in the specific erase unit.

The controller 120 may perform a garbage collection operation of gathering valid data of an erase unit (or erase units) in any other erase unit and reserving the corresponding erase unit (or erase units) as an erase target. The controller 120 may improve a speed of the garbage collection operation by selecting any other erase unit in the over provision area 126*a*.

As described above, by specifying a portion of the nonvolatile memory device 110 as the over provision area 126*a*, the controller 120 may improve an access speed of the user area 125*a* and may improve a performance of the storage device 100.

However, to specify the over provision area 126*a* means that a portion of the storage area 110*a* of the nonvolatile memory device 110 is not provided to the host device. That is, a portion of the whole storage capacity of the storage device 100 is unusable by the host device.

The host device identifies the user area 125a as a storage capacity of the storage device 100. The host device may use a portion of the user area 125a as a spare area in compliance with a self-security policy. For example, the spare area may be specified based on a redundant array of inexpensive disks (RAID). The spare area may be specified based on a particular level of RAID (e.g., "RAID 6"), and may be used to recover data stored in two or more storage devices.

The over provision area 126a specified by the storage device 100 and the spare area specified by the storage device 100 may cause a decrease in a storage capacity usable by the host device among the storage capacity of the storage device 100. As a storage capacity of the storage device 100 decreases by redundancy, a reduction in the storage capacity available for usage (e.g., by a host device) of the storage device 100 may be excessive.

Figure 2:
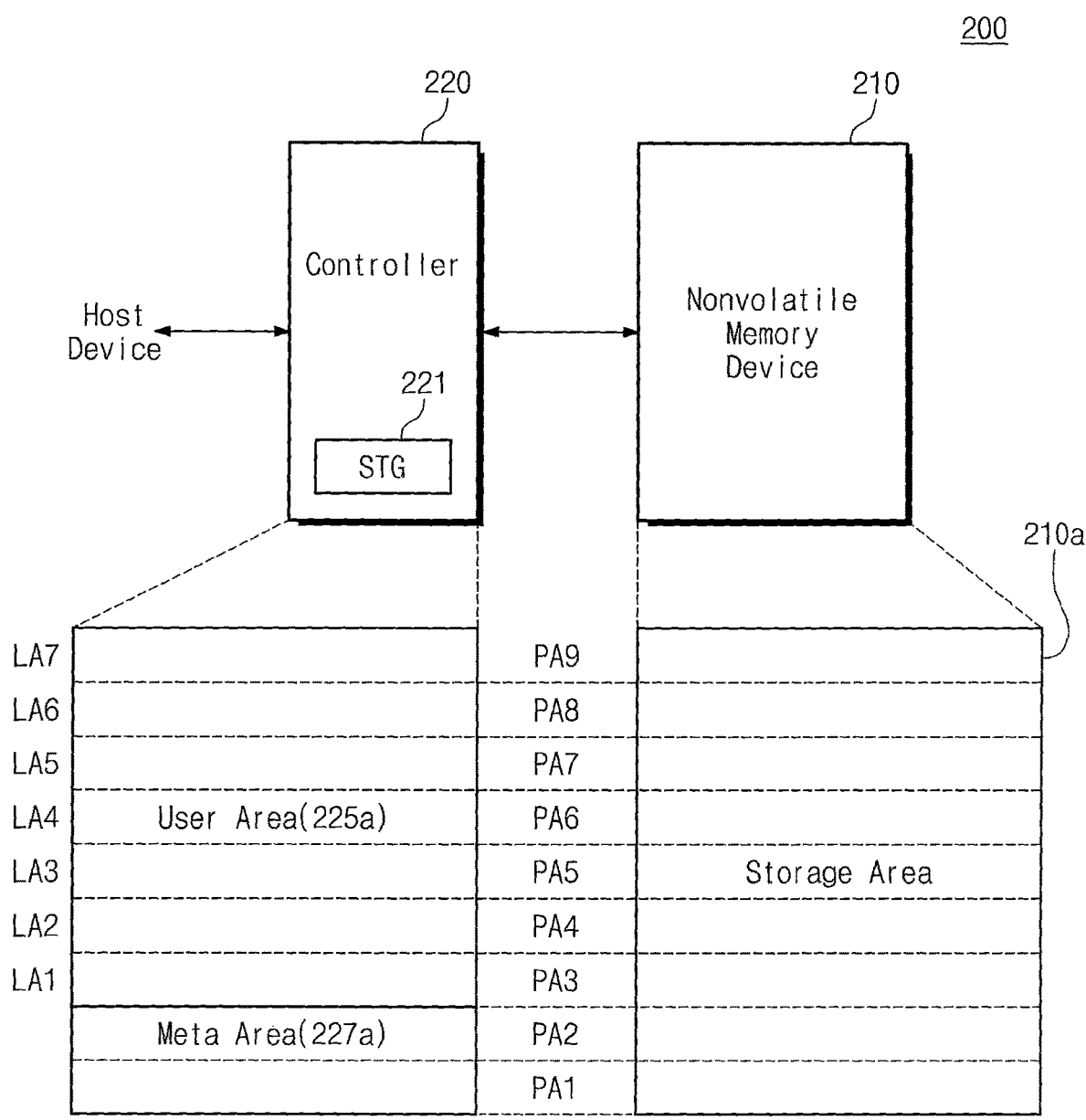
FIG. 2 illustrates a storage device according to another embodiment of the inventive concepts.

FIG. 2 illustrates a storage device 200 according to another embodiment of the inventive concepts. Referring to FIG. 2, the storage device 200 includes a nonvolatile memory device 210 and a controller 220. The nonvolatile memory device 210 may be identical to the nonvolatile memory device 110 described with reference to FIG. 1 and may provide a storage area 210a.

As described with reference to FIG. 1, the controller 220 may control the nonvolatile memory device 210, based on a request of an external host device or an internally designated schedule. The controller 220 may divide the storage area 210a of the nonvolatile memory device 210 into a user area 225a and a meta area 227a and may not specify an over provision area.

The user area 225a may be expanded as compared to the user area 125a of FIG. 1, as an over provision area is not specified in the storage area 210a of the nonvolatile memory device 210. As described with reference to FIG. 1, the controller 220 may provide the user area 225a to the host device by providing capacity information of the user area 225a stored in the storage 221 (STG) to the host device.

The host device may assign first to seventh logical addresses LA1 to LA7 to the user area 225a, and the first to seventh logical addresses LA1 to LA7 may be mapped onto physical addresses, For example, third to ninth physical addresses PA3 to PA9. As described with reference to FIG. 1, the controller 220 may store mapping information of logical addresses and physical addresses, firmware, or codes in the meta area 227a.

As described with reference to FIG. 1, physical addresses corresponding to the meta area 227a may be fixed or changed. Also, as described with reference to FIG. 1, physical addresses mapped onto logical addresses of the user area 225a may be changed.

The storage device 200 according to an embodiment of the inventive concepts may not specify an over provision area, and thus, a storage capacity of the storage device 200 may be prevented from being unusable by the host device. In addition, the storage device 200 according to an embodiment of the inventive concepts may use a spare area generated in the user area 225a by the host device as an over provision area. Accordingly, a performance of the storage device 200 may be improved.

Figure 3:
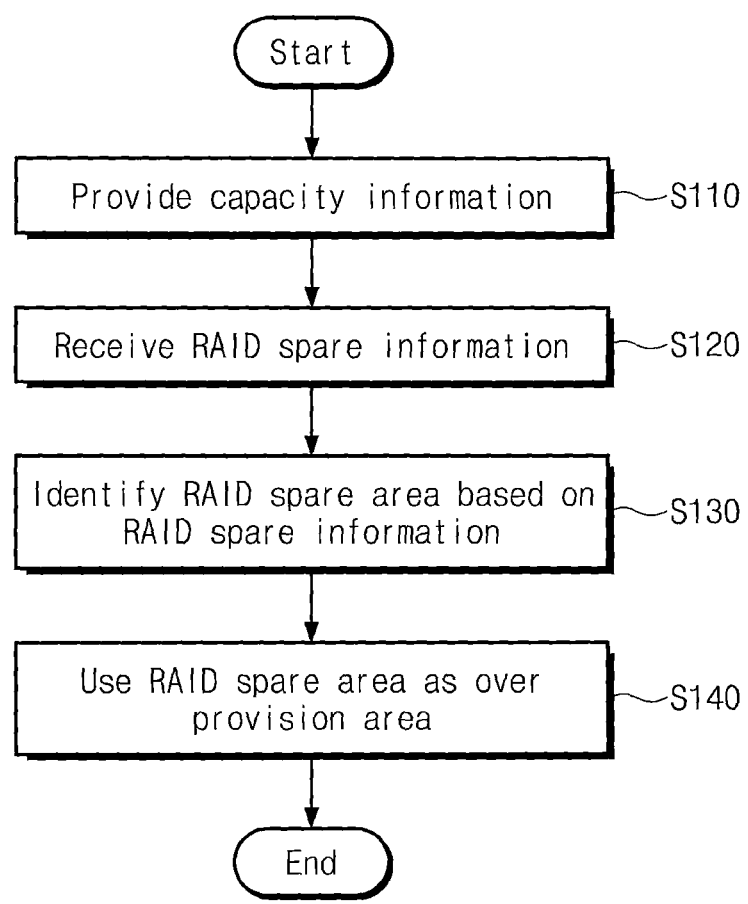
FIG. 3 illustrates an operating method of a storage device according to an embodiment of the inventive concepts.

FIG. 3 illustrates an operating method of the storage device 200 according to an embodiment of the inventive concepts. Referring to FIGS. 2 and 3, in operation S110, the controller 220 may provide capacity information to a host device. For example, the controller 220 may provide capacity information of the user area 225a stored in storage 221 to the host device.

The host device may specify a spare area to the storage device 200, based on the capacity information. For example, the spare area may be specified by logical addresses of the storage device 200. The spare area may be used when the host device recovers damaged data based on the RAID. That is, when data are not damaged, the spare area may not be used by the host device.

The host device may specify the spare area and may provide RAID spare information (e.g., logical addresses) about the spare area to the controller 220. In operation S120, the controller 220 may receive the RAID spare information from the host device.

For example, the spare information may be received in the form of a vendor unique command (VUC). The VUC may be an additional command that is provided in addition to commands that are defined in common (e.g., via an interface specification) as a mandatory command in general nonvolatile memory devices, such as a read command, a write command, and an erase command. The VUC may be defined by the agreement of a manufacturer of the storage device 200 and a manufacturer of the host device.

In operation S130, the controller 220 may identify a RAID spare area of the user area 225a, based on the RAID spare information. The controller 220 may identify the remaining area other than the RAID spare area in the user area 225a as a main use area. In operation S140, the controller 220 may use the RAID spare area as an over provision area.

Figure 4:
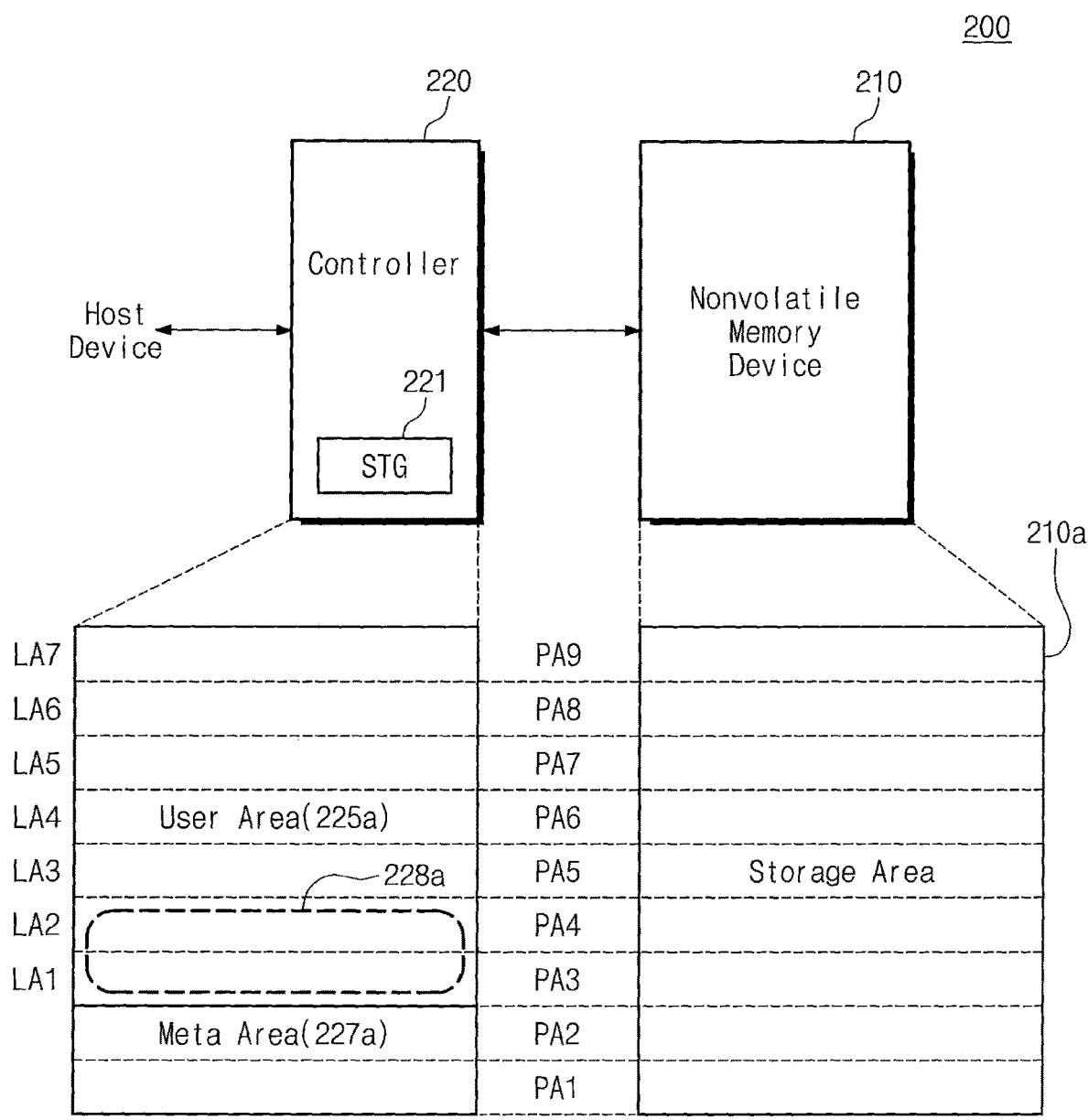
FIG. 4 illustrates an example in which a RAID spare area is specified according to the method of FIG. 3 in a storage device of FIG. 2.

FIG. 4 illustrates an example in which a RAID spare area is specified according to the method of FIG. 3 in the storage device 200 of FIG. 2. Referring to FIG. 4, for example, storage areas of the first and second logical addresses LA1 and LA2 may be specified as a RAID spare area 228a.

When RAID spare information is received from the host device, the controller 220 may identify that the storage areas of the first and second logical addresses LA1 and LA2 are specified as the RAID spare area 228a. As described above, the RAID spare area 228a is used by the host device in the event that data from the RAID are damaged.

When the event that data are damaged does not occur, the RAID spare area 228a is left alone, and is not used by the host device. Accordingly, while the RAID spare area 228a is left alone by the host device, the controller 220 may use the RAID spare area 228a, or at least a portion of the RAID spare area 228a, as an over provision area.

For example, as described with reference to FIG. 1, the controller 220 may use an over provision area to support a read operation and a write operation on a main use area of the user area 225a. As the RAID spare area 228a is used as an over provision area, the storage device 200 may reduce or prevent a reduction of a storage capacity available to a host device and may improve a performance of the storage device 200.

Figure 5:
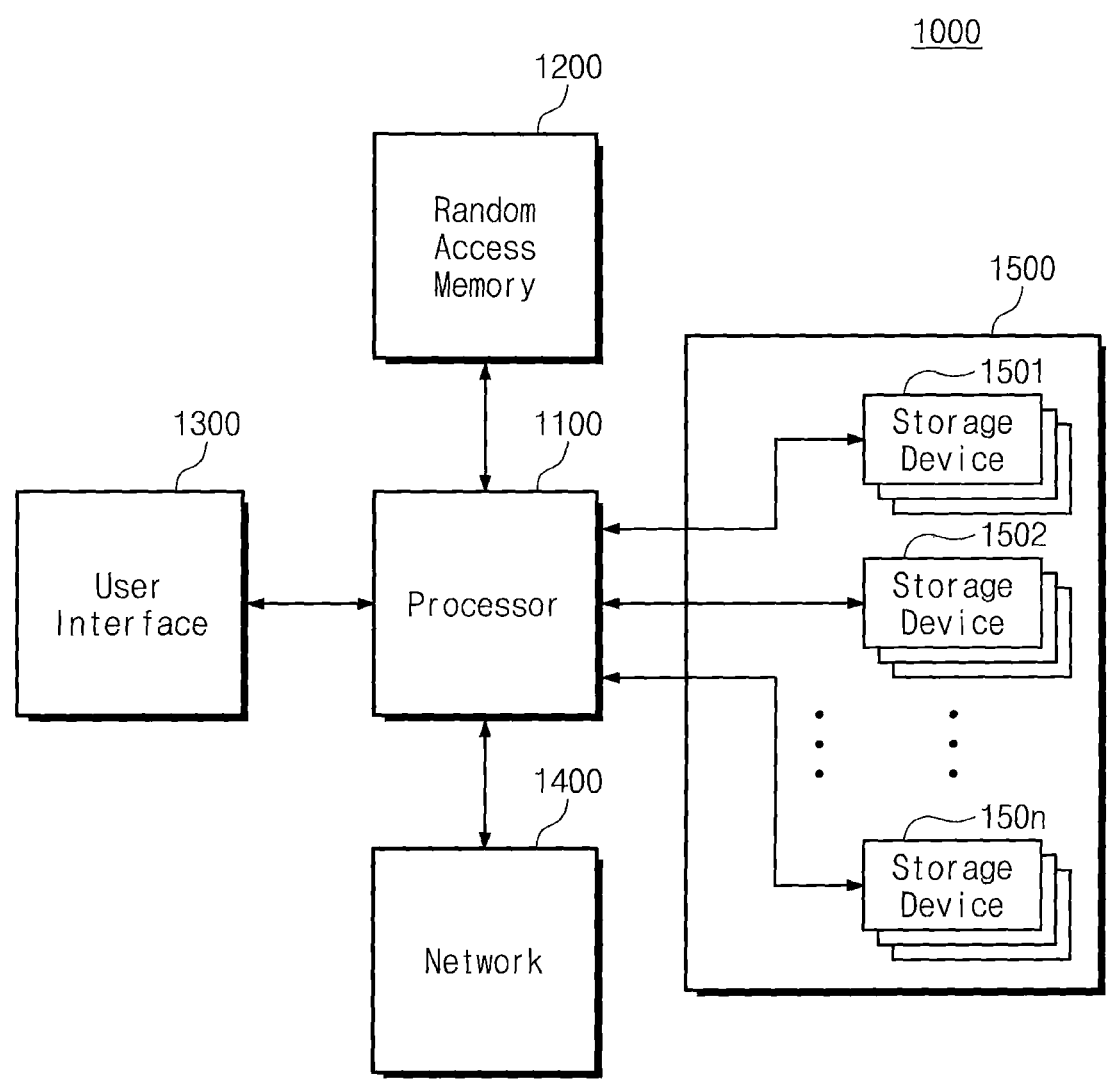
FIG. 5 illustrates a computing device including a storage device array.

FIG. 5 illustrates a computing device 1000 including a storage device array 1500. Referring to FIG. 5, the computing device 1000 includes a processor 1100, a random access memory 1200, a user interface 1300, a network 1400, and the storage device array 1500. For example, the computing device 1000 may be a server.

The processor 1100 may control the computing device 1000 and may execute, for example, an operating system and applications. The processor 1100 may use the random access memory 1200 as a buffer memory, a cache memory, and/or a system memory. The processor 1100 may store user data in the storage device array 1500. The processor 1100 may correspond to the host device described with respect to FIGS. 1 to 4.

The random access memory 1200 may store instances of the operating system and the applications which are executed by the processor 1100. The random access memory 1200 may store data input through the user interface 1300 or data to be output through the user interface 1300.

The random access memory 1200 may store data received through the network 1400 or data to be transmitted through the network 1400. The random access memory 1200 may store data to be stored in the storage device array 1500 or data read from the storage device array 1500.

The user interface 1300 may exchange information with a user of the computing device 1000. The user interface 1300 may include a user input interface such as, for example, a keyboard, a mouse, a touch panel, and/or a microphone, and a user output interface such as a monitor, a speaker, and/or a beam projector.

The network 1400 may communicate with an external device, for example, a client computer or any other server computer through wired or wireless communication. The storage device array 1500 may store user data. The storage device array 1500 may include first to n-th storage device groups 1501 to 150n.

Each of the first to n-th storage device groups 1501 to 150n may include two or more storage devices. To secure integrity of data, the processor 1100 may organize data to be stored in the first to n-th storage device groups 1501 to 150n, based on a data security and/or integrity manner, such as a RAID.

For example, the processor 1100 may organize data in the unit of the storage device array 1500 or in the unit of a storage device group 1501 to 150n. For purposes of discussion, it is assumed that the processor 1100 organizes data in the unit of a storage device group.

Figure 6:
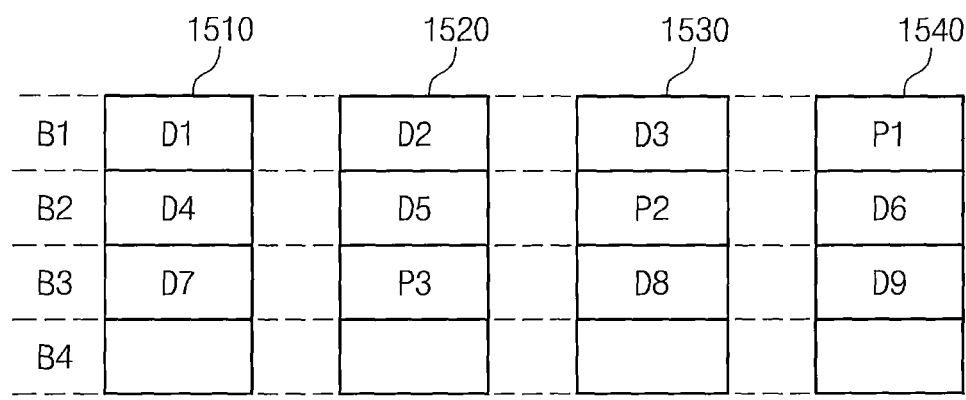
FIG. 6 illustrates an example in which a computing device of FIG. 5 stores data in a first storage device group.

FIG. 6 illustrates an example in which a computing device of FIG. 5 stores data in the first storage device group 1501. Referring to FIGS. 5 to 6, the first storage device group 1501 may include first to fourth storage devices 1510, 1520, 1530, 1540 (referred to herein as 1510 to 1540). Each of the first to fourth storage devices 1510 to 1540 may be configured and operate as described with reference to FIGS. 2 to 4. Though four storage devices are described for purposes of discussion, it will be understood that other quantities of storage devices may be used without deviating from the inventive concepts.

In an embodiment, a user area of each of the first to fourth storage devices 1510 to 1540 may be divided into first to fourth blocks B1 to B4. The processor 1100 may organize data based on the RAID and may store the organized data in the first to fourth storage devices 1510 to 1540.

For example, the processor 1100 may organize first to third data D1 to D3 so as to be stored in the first blocks B1 of the first to fourth storage devices 1510 to 1540. The processor 1100 may store the first to third data D1 to D3 in the first blocks B1 of the first to third storage devices 1510 to 1530. The processor 1100 may store a first parity P1 in the first block B1 of the fourth storage device 1540.

The processor 1100 may generate the first parity P1 from the first to third data D1 to D3. For example, the processor 1100 may generate the first parity P1 by performing an exclusive OR operation on the first to third data D1 to D3. When a fault occurs in any one of the first to third data D1 to D3, the first parity P1 may be used to recover the fault.

Likewise, the processor 1100 may store fourth to sixth data D4 to D6 and a second parity P2 in the second blocks B2 of the first to fourth storage devices 1510 to 1540. The second parity P2 may be generated from the fourth to sixth data D4 to D6. Likewise, the processor 1100 may store seventh to ninth data D7 to D9 and a third parity P3 in the third blocks B3 of the first to fourth storage devices 1510 to 1540. The third parity P3 may be generated from the seventh to ninth data D7 to D9.

The processor 1100 may specify the fourth blocks B4 of the first to fourth storage devices 1510 to 1540 as a RAID spare area. When a data fault does not occur, the processor 1100 may not store data in the fourth block B4 of each of the first to fourth storage devices 1510 to 1540. Therefore, according to embodiments of the inventive concepts described herein, the first to fourth storage devices 1510 to 1540 may use the RAID spare areas of the fourth blocks B4 as an over provision area.

Figure 7:
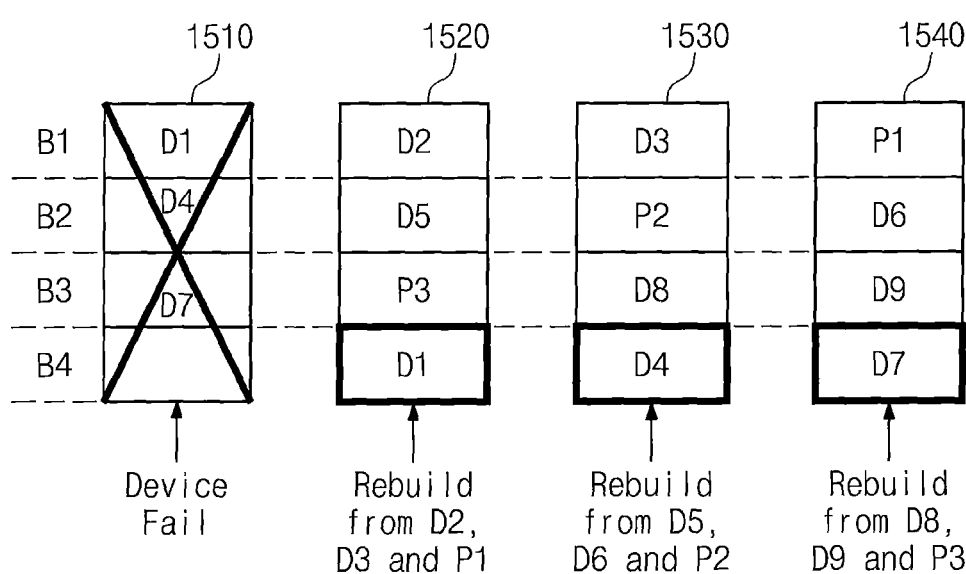
FIG. 7 illustrates an example in which data are recovered when a device failure occurs in a first storage device.

FIG. 7 illustrates an example in which data are recovered when a device failure occurs in the first storage device 1510. Referring to FIGS. 5 and 7, a device failure may occur in the first storage device 1510. Accordingly, the first data D1, the fourth data D4, and the seventh data D7 stored in the first storage device 1510 may be damaged.

The processor 1100 may recover data of the first storage device 1510 by using data and parities stored in the second to fourth storage devices 1520 to 1540. For example, the processor 1100 may read the second data D2, the third data D3, and the first parity P1 from the first blocks B1 of the second to fourth storage devices 1520 to 1540.

The processor 1100 may rebuild the first data D1 from the second data D2, the third data D3, and the first parity P1. For example, the processor 1100 may rebuild the first data D1 by performing an exclusive OR operation on the second data D2, the third data D3, and the first parity P1. The processor 1100 may store the rebuilt first data D1 in the fourth block B4 being a RAID spare area of the second storage device 1520.

Likewise, the processor 1100 may rebuild the fourth data D4 from the fifth data D5, the sixth data D6, and the second parity P2 stored in the second blocks B2 of the second to fourth storage devices 1520 to 1540. The processor 1100 may store the rebuilt fourth data D4 in the fourth block B4 being a RAID spare area of the third storage device 1530.

Likewise, the processor 1100 may rebuild the seventh data D7 from the eighth data D8, the ninth data D9, and the third parity P3 stored in the third blocks B3 of the second to fourth storage devices 1520 to 1540. The processor 1100 may store the rebuilt seventh data D7 in the fourth block B4 being a RAID spare area of the fourth storage device 1540.

All data of the first storage device group 1501 may be recovered by rebuilding the first data D1, the fourth data D4, and the seventh data D7. The processor 1100 may permit an access to data of the first storage device group 1501.

As described above, when the event that data are damaged occurs, the processor 1100 may use the RAID spare area. Accordingly, the storage device 200 according to an embodiment of the inventive concepts may be configured to stop using the RAID spare area as an over provision area when a request of the processor 1100 exists.

Figure 8:
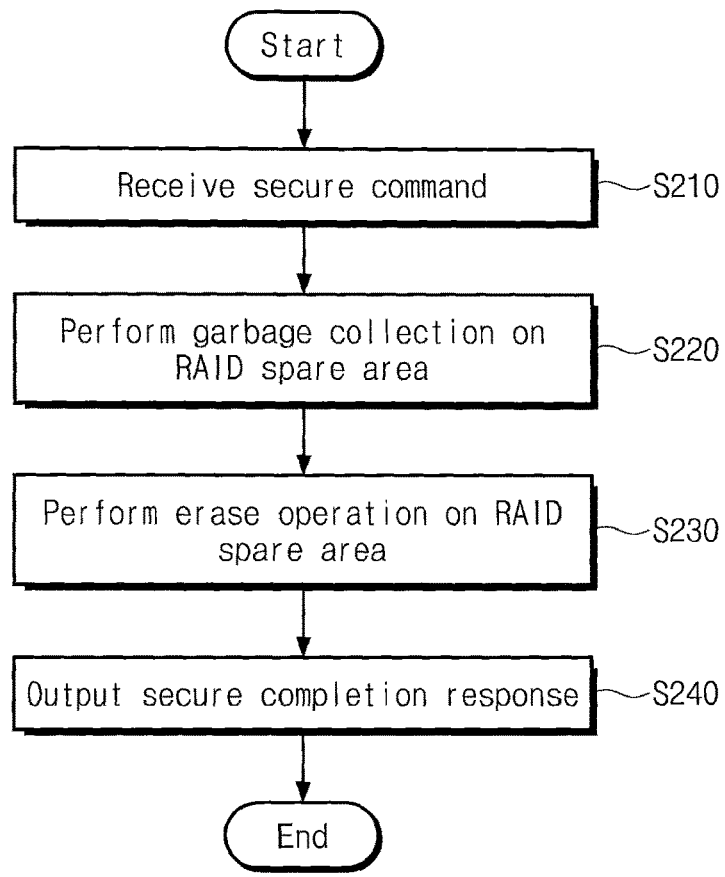
FIG. 8 illustrates a method in which a storage device according to an embodiment of the inventive concepts stops using a RAID spare area as an over provision area.

FIG. 8 illustrates a method in which the storage device 200 according to an embodiment of the inventive concepts stops using a RAID spare area as an over provision area. Referring to FIGS. 4 and 8, when it is necessary to rebuild data, a host device (e.g., the processor 1100 of FIG. 5) may provide a secure command to the controller 220. In operation S210, the controller 220 may receive the secure command from the host device. For example, the secure command may be received in the form of a VUC.

In operation S220, the controller 220 may perform a garbage collection operation on the RAID spare area 228a. For example, the controller 220 may move valid data stored in the RAID spare area 228a (e.g., data from the use of the RAID spare area 228a as an over provision area) to a main use area.

In operation S230, the controller 220 may perform an erase operation on the RAID spare area 228a. For example, the controller 220 may perform the erase operation on each of erase units, in which invalid data are stored, of the RAID spare area 228a. The controller 220 may skip the erase operation on erase units, which correspond to an erase state, of the RAID spare area 228a.

In operation S240, the controller 220 may output a secure completion response to the host device. The secure completion response may be output in the form of a response to the secure command. After transmitting the secure completion response, the controller 220 may prohibit the RAID spare area from being used as an over provision area.

As described above, when it is necessary to rebuild data, the storage device 200 may secure the RAID spare area and may provide the RAID spare area to the host device. Accordingly, the host device may successfully perform a data rebuild based on the RAID.

In an embodiment, the host device may transmit logical addresses of a portion, which may be used to rebuild data, of the RAID spare area 228a to the controller 220 together with the secure command. The controller 220 may perform the garbage collection operation (operation S220) and the erase operation (S230) only on the portion, which corresponds to the received logical addresses, of the RAID spare area 228a. When the portion corresponding to the received logical addresses is secured, the controller 220 may output the secure completion response to the host device.

In an embodiment, the host device may transmit information of a capacity, which is may be used rebuild data, to the controller 220 together with the secure command. The controller 220 may perform the garbage collection operation (operation S220) and the erase operation (S230) only on a portion, which corresponds to the rebuild capacity, of the RAID spare area 228a.

For example, the controller 220 may include erase units, which correspond to an erase state, of the RAID spare area 228a in the portion corresponding to the rebuild capacity. The controller 220 may output the logical addresses of the secured portion to the host device together with the secure completion response to the host device. The host device may perform a RAID rebuild, based on logical addresses received from the storage device 200.

In an embodiment, the controller 220 may secure a portion, which corresponds to a rebuild capacity and corresponds to the lowest or highest logical addresses, of the RAID spare area 228a. The controller 220 may output a message informing that the portion corresponding to the lowest or highest logical addresses is secured, to the host device together with the secure completion response.

For another example, when the storage device 200 is connected to the host device, the host device may set the storage device 200 so as to secure the portion corresponding to the lowest or highest logical addresses. Based on settings made in advance, the host device may identify the logical addresses of the secured portion of the RAID spare area 228a without separate information from the storage device 200.

In an embodiment, when the portion corresponding to the requested capacity among the RAID spare area 228a is returned to the host device, the controller 220 may continue to use the remaining portion of the RAID spare area 228a as an over provision area.

Retuning to FIGS. 5 and 7, a user (e.g., a manager) of the computing device 1000 may replace the first storage device 1510 at which a device failure occurs. After replacing the first storage device 1510, the processor 1100 may again move the first data D1, the fourth data D4, and the seventh parity D7 stored in the fourth blocks B4 being a RAID spare area 228a of the second to fourth storage devices 1520 to 1540 to the now-replaced first storage device 1510.

After the first storage device 1510 is replaced and data are moved, the fourth blocks B4 being a RAID spare area may again be unused. Accordingly, the RAID spare area 228a may again be used as an over provision area.

Figure 9:
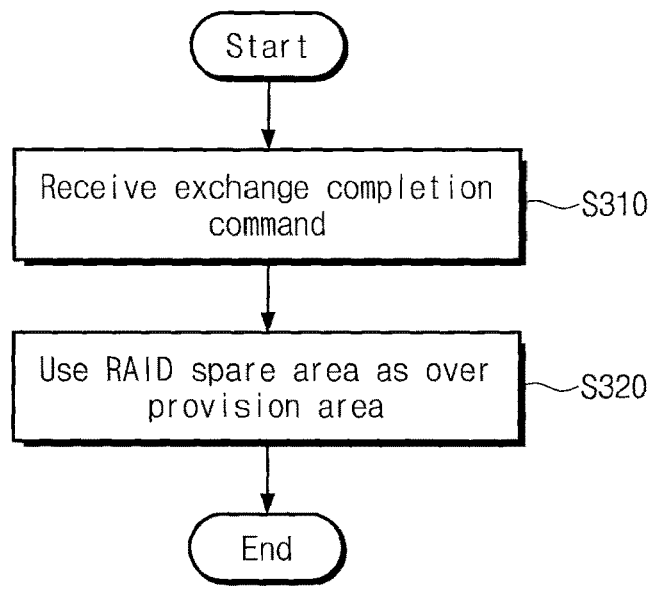
FIG. 9 illustrates an example in which a storage device according to an embodiment of the inventive concepts again uses a RAID spare area as an over provision area.

FIG. 9 illustrates an example in which the storage device 200 according to an embodiment of the inventive concepts again uses the RAID spare area 228a as an over provision area. Referring to FIGS. 4 and 9, as a storage device at which a device failure occurs is completely replaced and data are completely moved, a host device (e.g., the processor 1100 of FIG. 5) may provide an exchange completion command to the storage device 200.

In operation S310, the controller 220 may receive the exchange completion command from the host device. In some embodiments, the exchange completion command may be received in the form of a VUC. In response to the exchange completion command, in operation S320, the controller 220 may again use the RAID spare area 228a as an over provision area.

Figure 10:
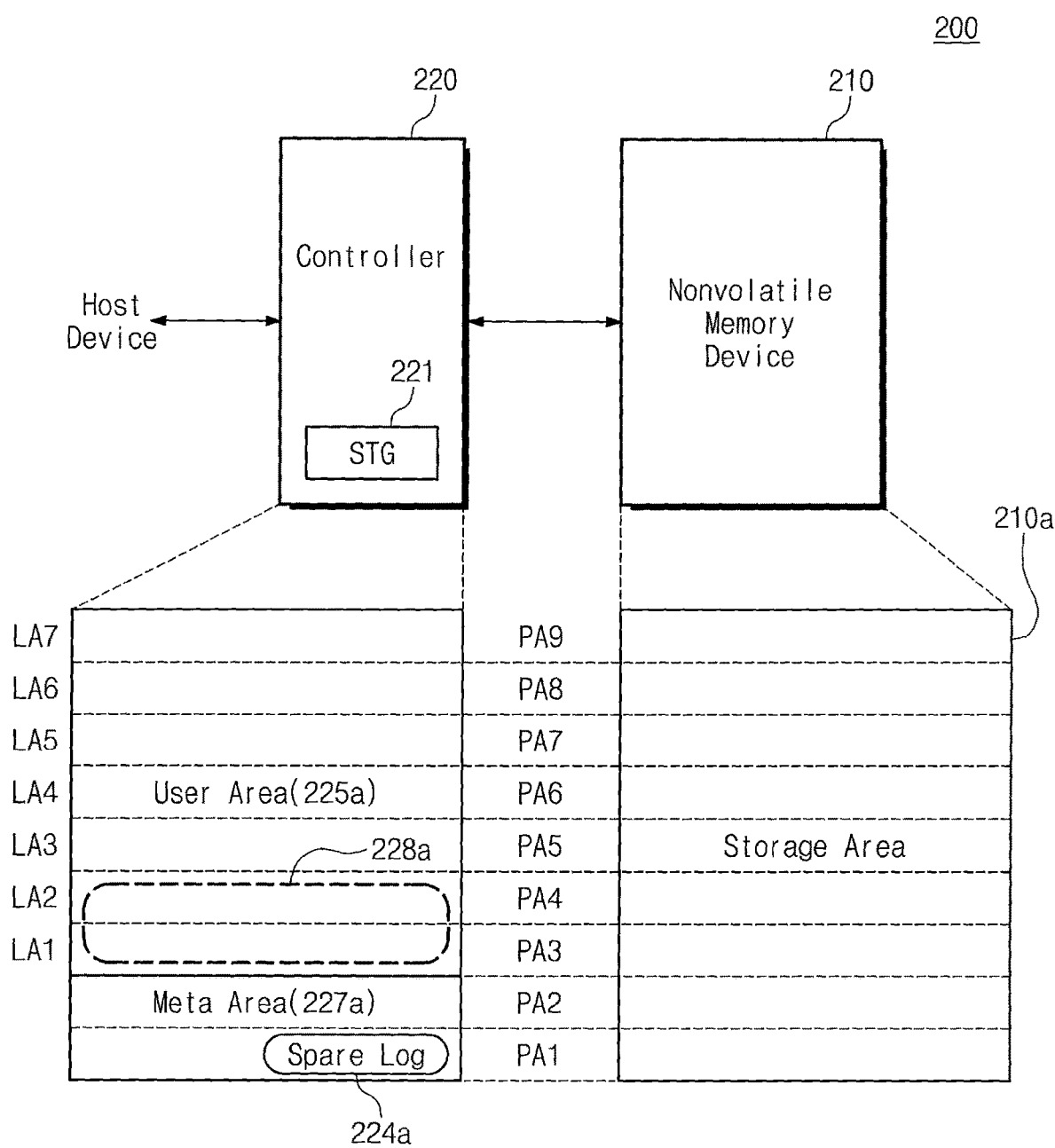
FIG. 10 illustrates an example in which a storage device records information about a RAID spare area.

FIG. 10 illustrates an example in which the storage device 200 records information about the RAID spare area 228a. Referring to FIG. 10, the controller 220 may record information about the RAID spare area 228a as a spare log 224a at the meta area 227a.

The storage device 200 may use the RAID spare area 228a specified by the host device as an over provision area. A capacity (or a ratio) of the over provision area may have an influence on a lifetime of the storage device 200. That is, the lifetime of the storage device 200 may have an influence of the host device.

For example, as a capacity (or a ratio) of the over provision area increases, a write amplification factor (WAF) which has an influence on the lifetime of the storage device 200 may decrease. In contrast, as a capacity (or a ratio) of the over provision area decreases, the write amplification factor (WAF) which has an influence on the lifetime of the storage device 200 may increase.

As in the above description, as a capacity (or a ratio) of the over provision area increases, a drive writes per day (DWPD) characteristic indicating the lifetime of the storage device 200 may increase. In contrast, as a capacity (or a ratio) of the over provision area decreases, the drive writes per day (DWPD) characteristic indicating the lifetime of the storage device 200 may decrease.

The controller 220 may record a capacity of the RAID spare area 228a, or a change in the capacity, at the spare log 224a. In detail, the controller 220 may record a capacity of a portion, which is used as an over provision area, of the RAID spare area 228a or a change in the capacity at the spare log 224a. Whether the lifetime of the storage device 200 is exhausted may be identified by referring to the spare log 224a.

Figure 11:
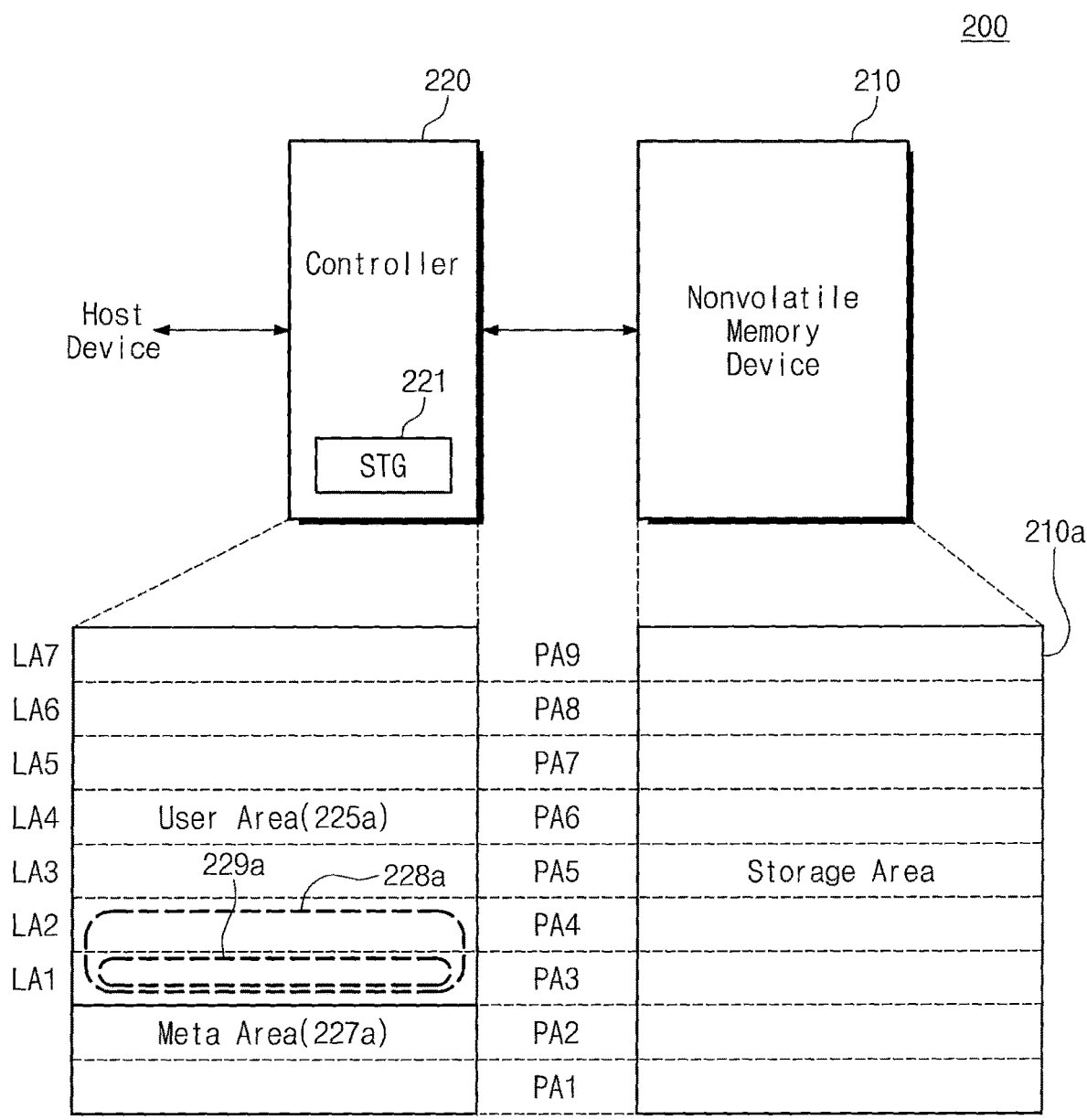
FIG. 11 illustrates an example in which a storage device uses a partial area of a RAID spare area as an over provision area.

FIG. 11 illustrates an example in which the storage device 200 uses a partial area 229a of the RAID spare area 228a as an over provision area. Referring to FIG. 11, the controller 220 may use the partial area 229a of the RAID spare area 228a as an over provision area. The controller 220 may maintain the remaining area of the RAID spare area 228a as a free RAID spare area.

For example, the host device may transmit information of the RAID spare area 228a and information of the partial area 229a usable as the over provision area among the RAID spare area 228a to the controller 220. The controller 220 may use the partial area 229a of the RAID spare area 228a as the over provision area, based on information from the host device.

For another example, the controller 220 may receive information of the RAID spare area 228a from the host device. When a capacity of the RAID spare area 228a is greater than a threshold or, in some embodiments, regardless of a capacity of the RAID spare area 228a, the controller 220 may use the partial area 229a of the RAID spare area 228a as the over provision area.

Figure 12:
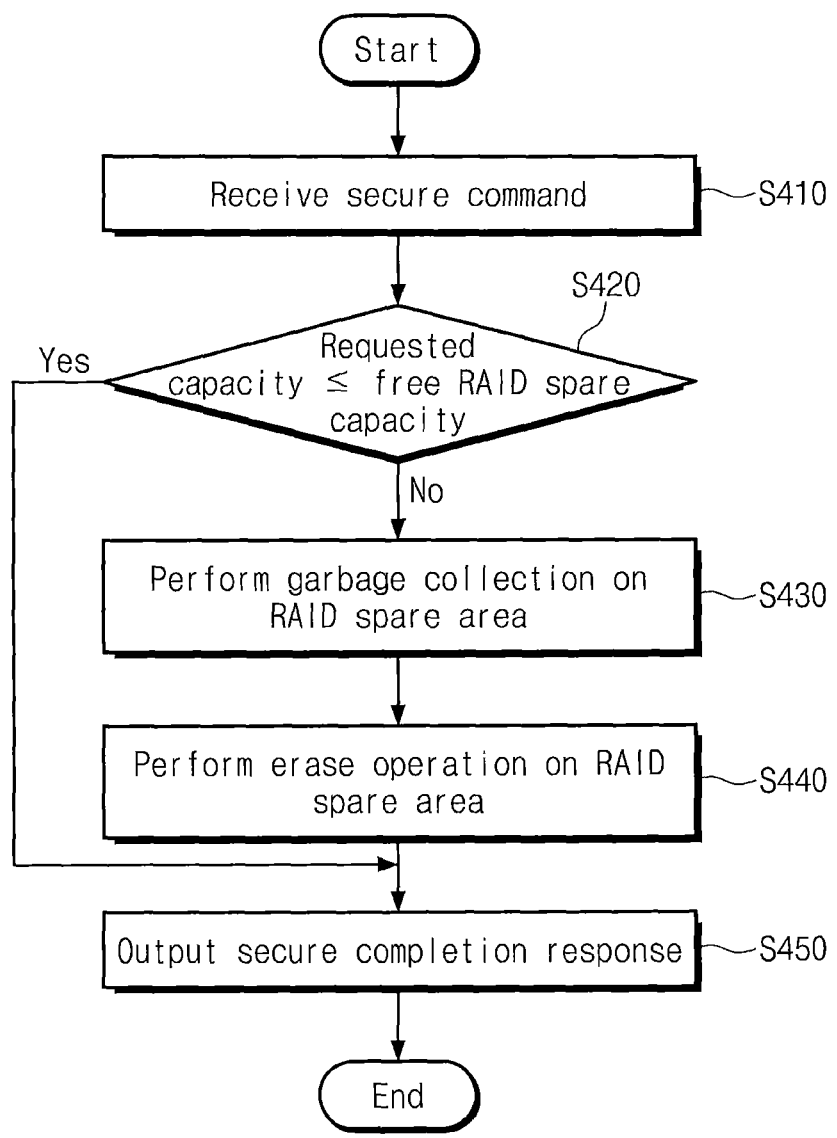
FIG. 12 illustrates a method in which a storage device of FIG. 11 supports a RAID rebuild.

FIG. 12 illustrates a method in which the storage device 200 of FIG. 11 supports a RAID rebuild. Referring to FIGS. 11 and 2, when a RAID rebuild is necessary, the host device may transmit the secure command to the controller 220. In operation S410, the controller 220 may receive the secure command. For example, the secure command may be received together with information of a capacity necessary for the RAID rebuild. In some embodiments, the secure command may be received in the form of a VUC.

In operation S420, the controller 220 may determine whether the requested capacity is not greater than a free RAID spare capacity. In some embodiments, the free RAID spare capacity may be a capacity of the RAID spare area 228a that is not being used by the controller 220 for over provisioning. When the requested capacity is greater than the free RAID spare capacity, operation S430 is performed. In operation S430, the controller 220 may perform a garbage collection operation on a portion of the RAID spare area 228a used as the over provision area.

In operation S440, the controller 220 may perform an erase operation on the portion of the RAID spare area 228a used as the over provision area. In an embodiment, as described with reference to FIG. 9, a garbage collection operation and an erase operation associated with an erase unit having an erase state may be omitted.

Also, as described with reference to FIG. 8, the garbage collection operation and the erase operation may be performed only on the portion corresponding to the requested capacity among the portion of the RAID spare area 228a used as the over provision area.

Afterwards, when the requested capacity is secured, in operation S450, the controller 220 may output the secure completion response to the host device. Afterwards, the controller 220 may prohibit the RAID spare area 228a from being used as an over provision area.

In an embodiment, as described with reference to FIG. 8, when the portion corresponding to the requested capacity among the RAID spare area 228a is returned to the host device, the controller 220 may continue to use the remaining portion of the RAID spare area 228a as an over provision area. For example, when a remaining portion of the RAID spare area 228a is still available after satisfying the requested capacity of the RAID spare area 228a, the controller 220 may continue, or begin, to use the remaining portion of the RAID spare area 228a as an over provision area.

When it is determined in operation S420 that the requested capacity is not greater than the free RAID spare capacity, the controller 220 may determine that the requested capacity is already secured. Afterwards, in operation S450, the controller 220 may output the secure completion response to the host device.

As described with reference to FIGS. 11 and 12, the storage device 200 may use a RAID spare area as an over provision area and a free RAID spare area. Accordingly, a performance for accessing the user area 225a of the storage device 200 may be improved, and a response speed associated with a RAID rebuild may be improved.

Figure 13:
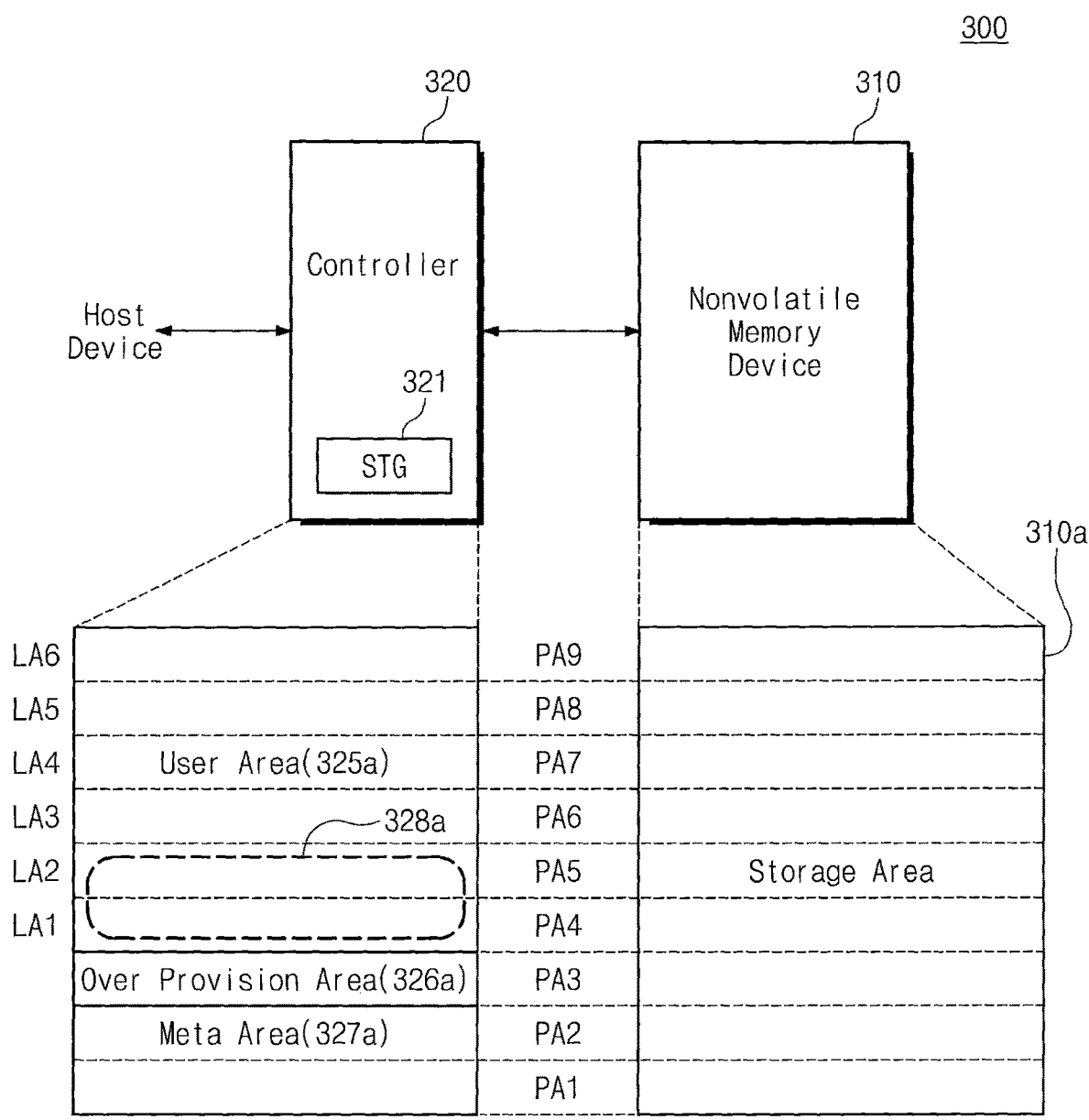
FIG. 13 illustrates a storage device according to another embodiment of the inventive concepts.

FIG. 13 illustrates a storage device 300 according to another embodiment of the inventive concepts. Referring to FIG. 13, the storage device 300 includes a nonvolatile memory device 310 and a controller 320. The controller 320 includes storage 321.

The controller 320 may divide a storage area 310a of the nonvolatile memory device 310 into a user area 325a, an over provision area 326a, and a meta area 327a. The controller 320 may provide capacity information of the user area 325a stored in storage 321 to the host device. The host device may assign first to sixth logical addresses LA1 to LA6 to the user area 325a.

Compared to the storage device 100 of FIG. 1, a weight of the storage device 300 which the storage device 300 specifies may decrease. As described with reference to FIG. 4 or 10, the controller 320 may use a RAID spare area 328a or a partial area of the RAID spare area 328a as an additional over provision area. In some embodiments, the storage device 300 may maintain a first over provision area 326a, but may use the RAID spare area 328a or the partial area of the RAID spare area 328a as a second over provision area, so as to reduce an impact of the over provision area on the available storage provided to the host device.

Also, as described with reference to FIG. 10, the controller 320 may record a capacity of a portion, which is used as an over provision area, of the RAID spare area 328a, or a change in the capacity, at the meta area 327a as a spare log.

In the above embodiments, a description is given as a spare area used as an over provision area is specified based on a RAID configuration. However, the storage device 200 or 300 according to an embodiment of the inventive concepts may be changed or modified to use a spare area, which is specified in compliance with any other policy not associated with a RAID configuration, as an over provision area.

In the above embodiments, a description is given as the over provision area supports a read operation and a write operation of a flash memory device. However, the storage device 200 or 300 according to an embodiment of the inventive concepts may be changed or modified to use an over provision area to support (or accelerate) operations of any other nonvolatile memory device, not just the flash memory device.

In the above embodiments, components according to embodiments of the inventive concepts are described by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits or intellectual property (IP) implemented with semiconductor elements in an integrated circuit.

It will be understood that although the terms "first," "second," etc. are used herein to describe members, regions, layers, portions, sections, components, and/or elements in example embodiments of the inventive concepts, the members, regions, layers, portions, sections, components, and/or elements should not be limited by these terms. These terms are only used to distinguish one member, region, portion, section, component, or element from another member, region, portion, section, component, or element. Thus, a first member, region, portion, section, component, or element described below may also be referred to as a second member, region, portion, section, component, or element without departing from the scope of the inventive concepts. For example, a first element may also be referred to as a second element, and similarly, a second element may also be referred to as a first element, without departing from the scope of the inventive concepts.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by those of ordinary skill in the art to which the inventive concepts pertain. It will also be understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When a certain example embodiment may be implemented differently, a specific process order may be performed differently from the described order. For example, two consecutively described processes may be performed substantially at the same time or performed in an order opposite to the described order.

As used herein, the term "and/or" includes any and all combinations of one or more of the associated listed items. Expressions such as "at least one of," when preceding a list of elements, modify the entire list of elements and do not modify the individual elements of the list.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

According to embodiments of the inventive concepts, a storage device may not specify or may reduce a storage space for performance improvement. The storage device may use a spare area specified by a host device as the storage space for performance improvement. Accordingly, the storage device increasing a storage space available for use by a host and an operating method of the storage device are provided.

While the inventive concepts have been described with reference to example embodiments thereof, it will be apparent to those of ordinary skill in the art that various changes and modifications may be made thereto without departing from the spirit and scope of the inventive concepts as set forth in the following claims.

What is claimed is:

1. A storage device comprising:
   a nonvolatile memory device comprising a storage space; and
   a controller configured to divide and manage the storage space of the nonvolatile memory device into a user area and a meta area and to provide access to the user area to a host device, wherein the user area is configured to be accessed by the host device using logical addresses,
   wherein, responsive to receiving a command from the host device comprising RAID spare information comprising a first logical address of the logical addresses that specifies a location of a RAID spare area, the controller is further configured to select the RAID spare area within the user area based on the RAID spare information and to use at least a portion of the RAID spare area within the user area as an over provision area, and
   wherein the at least the portion of the RAID spare area that is used as the over provision area is configured to be accessed by the host device using the logical addresses.

2. The storage device of claim 1, wherein a remaining area of the user area except for the RAID spare area is a main use area, and
   wherein the controller is further configured to support a read operation and a write operation for the main use area by using the over provision area.

3. The storage device of claim 1, wherein the controller is further configured to store mapping information of physical addresses and the logical addresses of the user area in the meta area.

4. The storage device of claim 1, wherein the command is a first command, and
   wherein, responsive to receiving a second command corresponding to the RAID spare area from the host device, the controller is further configured to erase data stored in the over provision area and to output a completion response to the host device in response to the second command.

5. The storage device of claim 4, wherein a remaining area of the user area except for the RAID spare area is a main use area, and
   wherein, before erasing the data stored in the over provision area, the controller is further configured to move valid data of the data stored in the over provision area to the main use area.

6. The storage device of claim 4, wherein the second command from the host device further comprises capacity information indicating an amount of storage space necessary for repair of a RAID array associated with the RAID spare area, and
   wherein the controller is further configured to erase data stored in a portion of the over provision area corresponding to the capacity information.

7. The storage device of claim 6, wherein the controller is further configured to output addresses of the portion of the over provision area corresponding to the capacity information to the host device in response to the second command together with the completion response.

8. The storage device of claim 6, wherein the portion of the over provision area corresponding to the capacity information corresponds to a lowest logical address or a highest logical address of the logical addresses of the RAID spare area.

9. The storage device of claim 4, wherein, after outputting the completion response to the host device, the controller is further configured to prohibit the at least the portion of the RAID spare area from being used as the over provision area.

10. The storage device of claim 4, wherein, responsive to receiving an exchange completion command from the host device, the controller is further configured to again use the at least the portion of the RAID spare area as the over provision area.

11. The storage device of claim 1, wherein the controller is further configured to store the RAID spare information in the meta area.

12. The storage device of claim 1, wherein the controller is further configured to store a change history of the RAID spare information in the meta area.

13. The storage device of claim 1, wherein the command is a first command,
wherein a remaining portion of the RAID spare area except for the over provision area is a free RAID spare area, and
wherein, responsive to receiving a second command and capacity information indicating a first capacity of storage space necessary for repair of a RAID array associated with the RAID spare area from the host device, the controller is further configured to compare the first capacity that the capacity information indicates with a second capacity of the free RAID spare area and to output a completion response to the host device in response to the second command when the first capacity is not greater than the second capacity.

14. The storage device of claim 13, wherein, when the first capacity is greater than the second capacity, the controller is further configured to erase data stored in the over provision area and to output the completion response to the host device.

15. A storage device comprising:
a nonvolatile memory device comprising a storage space; and
a controller configured to divide and manage the storage space of the nonvolatile memory device into a user area, a first over provision area, and a meta area and to provide access to the user area to a host device, wherein the user area is configured to be accessed by the host device using a plurality of logical addresses, and
wherein, responsive to receiving a command from the host device comprising RAID spare information comprising a first logical address of the plurality of logical addresses that specifies a location of a RAID spare area, the controller is further configured to select the RAID spare area within the user area based on the RAID spare information and to use at least a portion of the RAID spare area within the user area as a second over provision area.

16. The storage device of claim 15, wherein a remaining area of the user area except for the RAID spare area is a main use area, and
wherein the first logical address of the plurality of logical addresses of the RAID spare area assigned by the host device is fixed.

17. The storage device of claim 16, wherein the controller is further configured to map the first logical address onto a first physical address of the nonvolatile memory device, and
wherein the first physical address and is variable.

18. The storage device of claim 15, wherein a remaining area of the user area except for the RAID spare area is a main use area, and
wherein the controller is further configured to support a read operation and a write operation for the main use area by using the first over provision area and the second over provision area.

19. A method of operating a storage device comprising a nonvolatile memory device and a controller, the method comprising:
providing, by the controller, capacity information of a user area of the storage device to a host device;
receiving, by the controller, a first command from the host device comprising RAID spare information;
dividing, by the controller, the user area into a main use area and a RAID spare area based on the RAID spare information, wherein both the main use area and the RAID spare area are configured to be accessed by the host device using logical addresses, and
wherein the RAID spare area is configured to be used to repair damaged data of a RAID Array; and
supporting, by the controller, a read operation and a write operation for the main use area by using at least a portion of the RAID spare area as an over provision area,
wherein the RAID spare information comprises a first logical address of the logical addresses that specifies a location of the RAID spare area.

20. The method of claim 19, further comprising:
receiving, by the controller, a second command from the host device;
erasing, by the controller, data stored in the over provision area in response to the second command; and
outputting, by the controller, a completion response to the host device responsive to a completion of the erasing of the data.

* * * * *